(12) United States Patent
Zhang et al.

(10) Patent No.: US 11,512,976 B2
(45) Date of Patent: Nov. 29, 2022

(54) LATITUDE-FREE INITIAL ALIGNMENT METHOD UNDER SWAYING BASE BASED ON GRADIENT DESCENT OPTIMIZATION

(71) Applicant: Harbin Institute of Technology, Harbin (CN)

(72) Inventors: Ya Zhang, Harbin (CN); Qian Sun, Harbin (CN); Wei Gao, Harbin (CN); Fei Yu, Harbin (CN); Yanyan Wang, Harbin (CN); Xiuwei Xia, Harbin (CN); Jianxiong Wei, Harbin (CN); Weiqi Miao, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 17/236,237

(22) Filed: Apr. 21, 2021

(65) Prior Publication Data

US 2021/0262828 A1 Aug. 26, 2021

(30) Foreign Application Priority Data

Aug. 20, 2020 (CN) .......................... 202010840621.6

(51) Int. Cl.
  *G01C 25/00* (2006.01)
  *G01C 21/18* (2006.01)
  *G06F 17/16* (2006.01)

(52) U.S. Cl.
  CPC ............ *G01C 25/005* (2013.01); *G01C 21/18* (2013.01); *G06F 17/16* (2013.01)

(58) Field of Classification Search
  CPC ........ G01C 25/005; G01C 21/18; G06F 17/16
  See application file for complete search history.

(56) References Cited

FOREIGN PATENT DOCUMENTS

CN 105180937 A * 12/2015 ............. G01C 21/18

OTHER PUBLICATIONS

Jingchun Li, Wei Gao, and Ya Zhang, Gravitational Apparent Motion-Based Self-Alignment Method for Underwater Vehicles, IEEE Transactions on Vehicular Technology, Dec. 2018 (Year: 2018).*

(Continued)

*Primary Examiner* — Natalie Huls
*Assistant Examiner* — Cynthia L Davis
(74) *Attorney, Agent, or Firm* — IPro, PLLC; Na Xu

(57) ABSTRACT

The disclosure discloses a latitude-free initial alignment method under a swaying base based on gradient descent optimization. Firstly, swaying base latitude-free alignment is regarded as a Wahba attitude determination problem to inhibit device noise interference, and an objective function is established based on a gravitational acceleration vector under an earth system; then an exact solution of the objective function is obtained through a gradient descent optimization method, and inertial system conversion quaternion estimation is achieved under the latitude-free condition; and finally, an attitude quaternion is determined by only using information of an accelerometer and a gyroscope of a strapdown attitude heading reference system, and therefore latitude-free initial alignment under the swaying base is achieved. The disclosure can solve the problem that initial alignment cannot be accomplished with unknown latitude under the swaying base, and thus the application range of the strapdown attitude heading reference system is ensured.

2 Claims, 3 Drawing Sheets

(56) References Cited

OTHER PUBLICATIONS

Jingchun Li, Wei Gao, Ya Zhang, and Zicheng Wang, Gradient Descent Optimization-Based Self-Alignment Method for Stationary SINS (IEEE Transactions on Instrumentation and Measurement, Aug. 9, 2019) (Year: 2019).*

* cited by examiner

LATITUDE-FREE INITIAL ALIGNMENT METHOD UNDER SWAYING BASE BASED ON GRADIENT DESCENT OPTIMIZATION

TECHNICAL FIELD

The disclosure herein relates to the field of initial alignment of a strapdown inertial navigation system, in particular to a latitude-free initial alignment method under a swaying base based on gradient descent optimization.

BACKGROUND

A strapdown attitude heading reference system adopts a gyroscope and an accelerometer to measure information of angular velocity and linear acceleration of motion of a carrier, can output the horizontal attitude and heading information of the carrier continuously in real time through calculating and possesses the advantages of being small in size, fast to start, high in autonomy, high in attitude measurement accuracy, and the like, thus being widely used as the attitude reference of combat units such as a combat vehicle, a warship and various weaponry platforms. The alignment speed and the alignment accuracy of an initial alignment technology which serves as a key technology of the strapdown attitude heading reference system will directly determine the starting response time and the attitude measurement accuracy of the strapdown attitude heading reference system. A traditional initial alignment technology does not need longitude information during alignment starting but greatly depend on external latitude information, which may reduce the system autonomy and security and influence the system survivability in a battlefield, especially under a swaying base.

Under the case of the swaying base, as the angular velocity caused by sea wave swaying motion is far greater than the rotational angular velocity of the earth, gyroscope output is low in signal-to-noise ratio, consequently a vector of the rotational angular velocity of the earth cannot be directly extracted from gyroscope output information, and at the moment, a traditional analytical static base alignment method cannot work. Besides, as a compass alignment and Kalman filtering combined alignment method needs to meet a condition that a misalignment angle is a small angle during application, initial alignment under the condition of heading angles in arbitrarily orientation of the swaying base cannot be achieved.

Although a constraint equation cannot be directly built through the rotational angular velocity of the earth under the case of the swaying base, an inertial system alignment method adopts a gravitational acceleration vector under an inertial system at two or more moments to build a corresponding constraint relation, and then an attitude transformation matrix is determined, thus being widely used for swaying base initial alignment. Usually, the inertial system alignment method can be classified into two types: one type is an inertial system analytical alignment method based on double vectors and the other type is an inertial system alignment method based on multivector optimization. Essentially, the double-vector inertial system analytical alignment method based on a velocity integral form and the inertial system alignment method based on multivector optimization both belong to the category of least square estimation and both have a good inhibiting effect on interferences such as device noise, external environment vibration, etc.

However, a traditional swaying base alignment method which includes the inertial system analytical alignment method based on the double vectors and the inertial system alignment method based on multivector optimization needs to obtain local latitude information by the aid of the Global Positioning System (GPS), a beacon transducer and other external equipment during initial alignment, which may reduce the autonomy and the security of the strapdown attitude heading reference system. As for swaying base initial alignment under the conditions such as water surface GPS signal lock loss, denial and receiving failure of locating signals under water, the traditional swaying base initial alignment method cannot accomplish an alignment task, which greatly limits the application range of the strapdown attitude heading reference system.

Accordingly, in order to solve the problem existing in latitude-free initial alignment under the swaying base, the disclosure herein provides a latitude-free initial alignment method under a swaying base based on gradient descent optimization. In the disclosure, a gradient descent optimization concept is applied to initial alignment, firstly swaying base latitude-free alignment is regarded as a Wahba attitude determination problem to inhibit device noise interference, and an objective function is established based on the gravitational acceleration vector under an earth system; then an exact solution of the objective function is obtained through a gradient descent optimization method, and inertial system conversion quaternion estimation is achieved under the latitude-free condition; and finally, an attitude quaternion is determined by only using the information of the accelerometer and the gyroscope of the strapdown attitude heading reference system, and therefore latitude-free initial alignment under the swaying base is achieved. The disclosure can solve the problem that initial alignment cannot be accomplished with unknown latitude under the swaying base, and thus the application range of the strapdown attitude heading reference system is ensured.

SUMMARY

An objective of the disclosure is to provide a method for initial alignment of a strapdown attitude heading reference system under a swaying base with unknown latitude.

A technical solution for achieving the objective of the disclosure is: a latitude-free initial alignment method under a swaying base based on gradient descent optimization, including the following steps:

step 1: establishing an objective function by using measured data in a period of time window;

step 2: obtaining an exact value of $$q_i^{i_{b0}}$$

by solving the objective function through a gradient descent optimization method;

step 3: further establishing an objective function by using a velocity vector and a position vector respectively in order to improve the inhibiting capability of an algorithm to inertial device noise and linear vibration interference;

step 4: obtaining an exact value of $$q_i^{i_{b0}}$$

by solving the objective function through the gradient descent optimization method; and step 5: accomplishing an attitude updating process by using the obtained inertial system quaternion $$q_i^{i_{b_0}},$$

thus completing a latitude-free initial alignment process under the swaying base.

In step 1, a specific method for establishing the objective function by using the measured data in a period of time window is:

$$\min_{q_i^{i_{b_0}}} \zeta\left(q_i^{i_{b_0}}, \tilde{g}^i(t_k), \tilde{f}^{i_{b_0}}(t_k)\right) = \frac{1}{2} \sum_{k_1, k_2} \left\| \eta\left(q_i^{i_{b_0}}, \tilde{g}^i(t_k), \tilde{f}^{i_{b_0}}(t_k)\right) \right\|^2$$

$$\eta\left(q_i^{i_{b_0}}, \tilde{g}^i(t_k), \tilde{f}^{i_{b_0}}(t_k)\right)$$

$$= \begin{pmatrix} q_i^{i_{b_0}} \otimes \tilde{g}^i(t_{k_1}) \otimes q_i^{i_{b_0}^*} + \tilde{f}^{i_{b_0}}(t_{k_1}) \\ q_i^{i_{b_0}} \otimes \tilde{g}^i(t_{k_2}) \otimes q_i^{i_{b_0}^*} + \tilde{f}^{i_{b_0}}(t_{k_2}) \end{pmatrix}.$$

In step 2, a specific method for obtaining the exact value of $$q_i^{i_{b_0}}$$

by solving the objective function through the gradient descent optimization method is:

$$q_i^{i_{b_0}}(k) = q_i^{i_{b_0}}(k-1) - \lambda(k) \frac{\nabla \zeta\left(q_i^{i_{b_0}}, \tilde{g}^i(t_k), \tilde{f}^{i_{b_0}}(t_k)\right)}{\left\| \nabla \zeta\left(q_i^{i_{b_0}}, \tilde{g}^i(t_k), \tilde{f}^{i_{b_0}}(t_k)\right) \right\|}$$

$$\nabla \zeta\left(q_i^{i_{b_0}}, \tilde{g}^i(t_k), \tilde{f}^{i_{b_0}}(t_k)\right) =$$

$$\frac{\partial \eta^T\left(q_i^{i_{b_0}}, \tilde{g}^i(t_k), \tilde{f}^{i_{b_0}}(t_k)\right)}{\partial q_i^{i_{b_0}}} \eta\left(q_i^{i_{b_0}}, \tilde{g}^i(t_k), \tilde{f}^{i_{b_0}}(t_k)\right),$$

where $$\nabla \zeta\left(q_i^{i_{b_0}}, \tilde{g}^i(t_k), \tilde{f}^{i_{b_0}}(t_k)\right)$$

represents a gradient vector of the objective function $$\zeta\left(q_i^{i_{b_0}}, \tilde{g}^i(t_k), \tilde{f}^{i_{b_0}}(t_k)\right),$$

and $\lambda(k)$ represents the $k^{th}$ iteration step length.

In step 3, a specific method for further establishing the objective function by using the velocity vector and the position vector respectively in order to improve the inhibiting capability of the algorithm to inertial device noise and linear vibration interference is:

$$\tilde{v}^{i_{b_0}}(t_k) = \int_{t_0}^{t_k} \tilde{f}^{i_{b_0}}(t)dt \quad \tilde{v}^i(t_k) = -\int_{t_0}^{t_k} \tilde{g}^i(t)dt$$

$$\tilde{p}^{i_{b_0}}(t_k) = \int_{t_0}^{t_k} \tilde{v}^{i_{b_0}}(t)dt \quad \tilde{p}^i(t_k) = \int_{t_0}^{t_k} \tilde{v}^i(t)dt$$

$$\min_{q_i^{i_{b_0}}} \zeta\left(q_i^{i_{b_0}}, \alpha(t_k), \beta(t_k)\right) = \frac{1}{2} \sum_{k_1, k_2} \left\| \eta\left(q_i^{i_{b_0}}, \alpha(t_k), \beta(t_k)\right) \right\|^2$$

$$\eta\left(q_i^{i_{b_0}}, \alpha(t_k), \beta(t_k)\right)$$

$$= \begin{pmatrix} q_i^{i_{b_0}} \otimes \alpha(t_{k_1}) \otimes q_i^{i_{b_0}^*} - \beta(t_{k_1}) \\ q_i^{i_{b_0}} \otimes \alpha(t_{k_2}) \otimes q_i^{i_{b_0}^*} - \beta(t_{k_2}) \end{pmatrix}.$$

In step 5, a specific method for accomplishing the attitude updating process by using the obtained inertial system quaternion $$q_i^{i_{b_0}},$$

thus completing the latitude-free initial alignment process under the swaying base is:

$$q_b^n(t_k) = q_e^n \otimes q_i^e(t_k) \otimes q_{i_{b_0}}^i \otimes q_b^{i_{b_0}}(t_k) .$$

$$= q_e^n \otimes q_e^{i^*}(t_k) \otimes q_i^{b^*} \otimes q_b^{i_{b_0}}(t_k)$$

Compared with the prior art, the disclosure has the beneficial effects:

Under the condition that a latitude of the swaying base is unknown, the objective function is established based on a gravitational acceleration vector under an earth system, further, an improvement is made to obtain the velocity-type and position-type objective function, the inertial system conversion quaternion is determined through gradient descent optimization, and the accuracy of swaying base initial alignment under the condition of no latitude is improved.

DETAILED DESCRIPTION

Figure 1:
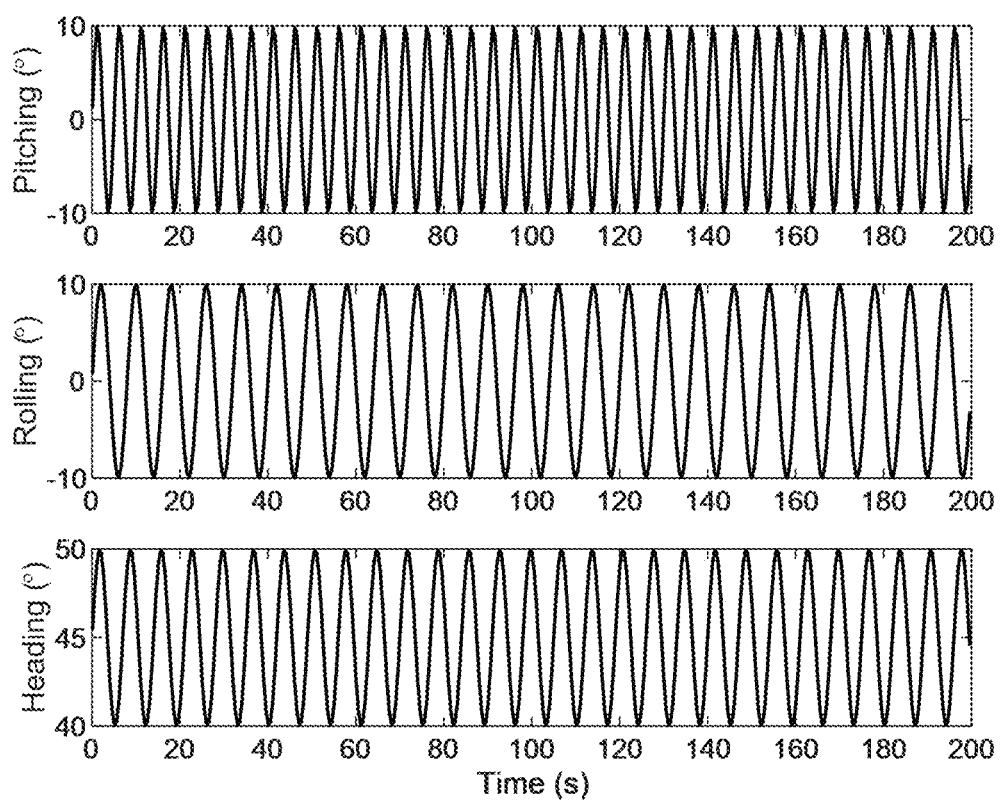
FIG. 1 is reference attitude motion curves under a swaying condition.

The disclosure is further described in combination with accompanying drawings below.

In order to verify the effectiveness of the disclosure, a method of the disclosure is simulated through Matlab®.

First, according to the definition of a coordinate system, at the moment of $t=t_0$, a carrier coordinate system b coincides with a solidification coordinate system and then $$q_b^{i_{b_0}}(t_0) = [1\ 0\ 0\ 0]^T.$$

Thus, a $q_b^{i_{b_0}}(t_k)$ updating equation is obtained:

$$\dot{q}_b^{i_{b_0}}(t_k) = \frac{1}{2} q_b^{i_{b_0}}(t_{k-1}) \otimes \tilde{\omega}_{i_{b_0}b}^b(t_k)$$

where $q_b^{i_{b_0}}(t_k)$ is a carrier swaying quaternion, representing coordinate change of a relative inertia solidification coordinate system caused by carrier swaying motion; and $\tilde{\omega}_{i_{b_0}b}^b(t_k)$ is information of gyroscope output angular velocity at the moment $t_k$.

Likewise, according to the definition of the coordinate system, a formula $q_e^i(t_0)=[1\ 0\ 0\ 0]^T$ is established, and a $q_e^i(t_k)$ updating equation is obtained:

$$\dot{q}_e^i(t_k) = \frac{1}{2} q_e^i(t_{k-1}) \otimes \omega_{ie}^e$$

where $q_e^i(t_k)$ is an earth rotation quaternion, representing coordinate change of a relative inertia system caused by the earth rotation; and $\omega_{ie}^e$ is a projection of a rotation angular velocity vector of the earth in an earth coordinate system, and $\omega_{ie}^e=[0\ 0\ 0\ \omega_{ie}]^T$.

Besides, if local latitude information is known, through rotation of two times, a position quaternion $q_e^n$ can be obtained:

$$q_e^n = q_{n'}^n \otimes q_e^{n'},$$

where $$\begin{cases} q_e^{n'} = \left[\cos\left(\frac{90°-L}{2}\right) 0 - \sin\left(\frac{90°-L}{2}\right) 0\right]^T \\ q_{n'}^n = [\cos(45°) 0 0 - \sin(45°)]^T \end{cases}.$$

According to a quaternion multiplication chain rule, an attitude quaternion $q_b^n(t_k)$ can be factorized into a product of four portions including the position quaternion $q_e^n$, the earth rotation quaternion $q_e^i(t_k)$, an inertial system conversion quaternion $q_{i_{b_0}}^i$ and the carrier swaying quaternion $q_b^{i_{b_0}}(t_k)$;

$$q_b^n(t_k) = q_e^n \otimes q_i^e(t_k) \otimes q_{i_{b_0}}^i \otimes q_b^{i_{b_0}}(t_k).$$

Moreover, a gravitational acceleration vector $g^n$ and a normalization vector $\bar{g}^n$ thereof under the system are written as follows:

$$g^n = [0\ 0\ -g]^T$$

$$\bar{g}^n = g^n/\|g^n\| [0\ 0\ -1]^T.$$

Likewise, a gravitational acceleration vector normalization form $\bar{g}^e$ under the system is written as follows:

$$\bar{g}^e = [-\cos L\ 0\ -\sin L]^T.$$

Then the gravitational acceleration vector is converted from an e system to an i system, as shown in a formula:

$$\bar{g}^i(t_k) = q_e^i(t_k) \otimes \bar{g}^e \otimes q_e^{i*}(t_k).$$

Further, the gravitational acceleration vector is converted from the e system to an $i_{b_0}$ system, as shown in a formula:

$$\bar{g}^{i_{b_0}}(t_k) = q_i^{i_{b_0}} \otimes \bar{g}^i(t_k) \otimes q_i^{*b_0}$$
$$= q_i^{i_{b_0}} \otimes q_e^i(t_k) \otimes \bar{g}^e \otimes q_e^{i*}(t_k) \otimes q_i^{*b_0}.$$

In a traditional inertial system alignment method, after the gravitational acceleration vector pair $\bar{g}^{i_{b_0}}(t_k)$ and $\bar{g}^i(t_k)$ is obtained, an objective function can be established, and then the inertia system conversion quaternion $q_i^{i_{b_0}}$ is determined. However, under the condition of no latitude, $\bar{g}^e$ and $\bar{g}^i(t_k)$ cannot be obtained due to lack of the local latitude information L, and thus $\bar{g}^e$ needs to be reconstructed. The objective function is established by using output information of an accelerometer in fixed-length sliding window, and a reconstructed gravitational acceleration is obtained by using a gradient descent optimization method to solve the objective function:

$$\tilde{g}^e = \left[-\sqrt{1 - \left(\frac{1}{m}\sum_{j=j_1}^{j_m} \tilde{f}_z''(t_j)\right)^2}\ 0\ -\frac{1}{m}\sum_{j=j_1}^{j_m} \tilde{f}_z'(t_j)\right]^T.$$

Under the inertial coordinate system i, a gravitational acceleration vector projection $\tilde{g}^i(t_k)$ is:

$$\tilde{g}^i(t_k) = q_e^i(t_k) \otimes q_e^{i*}(t_k).$$

Besides, at two different moments $t=t_{k1}$ and $t=t_{k2}$, a formula is established:

$$\begin{cases} \tilde{f}^{i_{b_0}}(t_{k_1}) = -q_i^{i_0} \otimes \tilde{g}^i(t_{k_1}) \otimes q_i^{i_{b_0}^*} \\ \tilde{f}^{i_{b_0}}(t_{k_2}) = -q_i^{i_0} \otimes \tilde{g}^i(t_{k_2}) \otimes q_i^{i_{b_0}^*} \end{cases}.$$

Likewise, inhibiting interference caused by inertial device noise by using measured data in a period of time window and establishing an objective function $$\zeta\left(q_i^{i_{b_0}}, \tilde{g}^i(t_k), \tilde{f}^{i_{b_0}}(t_k)\right)$$

are as follows:

$$\min_{q_i^{i_{b_0}}} \zeta\left(q_i^{i_{b_0}}, \tilde{g}^i(t_k), \tilde{f}^{i_{b_0}}(t_k)\right) = \frac{1}{2} \sum_{k_1, k_2} \left\|\eta\left(q_i^{i_{b_0}}, \tilde{g}^i(t_k), \tilde{f}^{i_{b_0}}(t_k)\right)\right\|^2$$

$$\eta\left(q_i^{i_{b_0}}, \tilde{g}^i(t_k), \tilde{f}^{i_{b_0}}(t_k)\right), \text{ and } = \begin{pmatrix} q_i^{i_{b_0}} \otimes \tilde{g}^i(t_{k_1}) \otimes q_i^{i_{b_0}^*} + \tilde{f}^{i_{b_0}}(t_{k_1}) \\ q_i^{i_{b_0}} \otimes \tilde{g}^i(t_{k_2}) \otimes q_i^{i_{b_0}^*} + \tilde{f}^{i_{b_0}}(t_{k_2}) \end{pmatrix}$$

the above formula is solved by using the gradient descent optimization method, and its iteration process is shown as follows:

$$q_i^{i_{b_0}}(k) = q_i^{i_{b_0}}(k-1) - \lambda(k) \frac{\nabla \zeta\left(q_i^{i_{b_0}}, \tilde{g}^i(t_k), \tilde{f}^{i_{b_0}}(t_k)\right)}{\left\|\nabla \zeta\left(q_i^{i_{b_0}}, \tilde{g}^i(t_k), \tilde{f}^{i_{b_0}}(t_k)\right)\right\|}$$

$$\nabla \zeta\left(q_i^{i_{b_0}}, \tilde{g}^i(t_k), \tilde{f}^{i_{b_0}}(t_k)\right) =$$

$$\frac{\partial \eta^T\left(q_i^{i_{b_0}}, \tilde{g}^i(t_k), \tilde{f}^{i_{b_0}}(t_k)\right)}{\partial q_i^{i_{b_0}}} \eta\left(q_i^{i_{b_0}}, \tilde{g}^i(t_k), \tilde{f}^{i_{b_0}}(t_k)\right)$$

where $$\nabla \zeta\left(q_i^{i_{b_0}}, \tilde{g}^i(t_k), \tilde{f}^{i_{b_0}}(t_k)\right)$$

represents a gradient vector of the objective function $$\zeta\left(q_i^{i_{b_0}}, \tilde{g}^i(t_k), \tilde{f}^{i_{b_0}}(t_k)\right),$$

and $\lambda(k)$ represents the $k^{th}$ iteration step length.

Likewise, $$q_i^{i_{b_0}}$$

can be determined as long as a vector point pair meeting the following formula can be found:

$$\begin{cases} \beta(t_{k_1}) = q_i^{i_{b_0}} \otimes \alpha(t_{k_1}) \otimes q_i^{i_{b_0}^*} \\ \beta(t_{k_2}) = q_i^{i_{b_0}} \otimes \alpha(t_{k_2}) \otimes q_i^{i_{b_0}^*} \end{cases},$$

where $\beta(t_k)$ and $\alpha(t_k)$ respectively represent projections of the vector pair under the inertial solidification coordinate system $$i_{b_0}$$

and the inertial coordinate system i.

A specific establishing mode for further establishing an objective function by using a velocity vector and a position vector respectively in order to improve the inhibiting capability of an algorithm to inertial device noise and linear vibration interference is as follows:

$$\tilde{v}^{i_{b_0}}(t_k) = \int_{t_0}^{t_k} \tilde{f}^{i_{b_0}}(t)dt \quad \tilde{v}^i(t_k) = -\int_{t_0}^{t_k} \tilde{g}^i(t)dt$$

$$\tilde{p}^{i_{b_0}}(t_k) = \int_{t_0}^{t_k} \tilde{v}^{i_{b_0}}(t)dt \quad \tilde{p}^i(t_k) = \int_{t_0}^{t_k} \tilde{v}^i(t)dt$$

$$\min_{q_i^{i_{b_0}}} \zeta\left(q_i^{i_{b_0}}, \alpha(t_k), \beta(t_k)\right) = \frac{1}{2} \sum_{k_1, k_2} \left\|\eta\left(q_i^{i_{b_0}}, \alpha(t_k), \beta(t_k)\right)\right\|^2$$

$$\eta\left(q_i^{i_{b_0}}, \alpha(t_k), \beta(t_k)\right) = \begin{pmatrix} q_i^{i_{b_0}} \otimes \alpha(t_{k_1}) \otimes q_i^{i_{b_0}^*} - \beta(t_{k_1}) \\ q_i^{i_{b_0}} \otimes \alpha(t_{k_2}) \otimes q_i^{i_{b_0}^*} - \beta(t_{k_2}) \end{pmatrix}.$$

Likewise, a determination result of the inertial system conversion quaternion $$q_i^{i_{b_0}}$$

is determined by using gradient descent optimization to solve the objective function.

A local latitude L is calculated by using the gravitational acceleration vector $\tilde{g}^e$:

$$L = \sin^{-1}(\tilde{g}_z^e) = \sin^{-1}\left(\frac{1}{m} \sum_{j=j_1}^{j_m} \tilde{f}_z^{i'}(t_j)\right).$$

Then after the local latitude information L is obtained through estimation, the position quaternion $q_e^n$ can be obtained:

$$q_e^n = \frac{\sqrt{2}}{2} \left[\cos\left(\frac{90° - L}{2}\right) - \sin\left(\frac{90° - L}{2}\right) - \sin\left(\frac{90° - L}{2}\right) - \cos\left(\frac{90° - L}{2}\right)\right]^T,$$

and thus the attitude quaternion $q_b^n(t)$ is obtained through updating:

$$q_b^n(t_k) = q_e^n \otimes q_i^e(t_k) \otimes q_{i_{b_0}}^i \otimes q_b^{i_{b_0}}(t_k) = q_e^n \otimes q_e^{i*}(t_k) \otimes q_i^{i_{b_0}^*} \otimes q_b^{i_{b_0}}(t_k).$$

In order to verify the effectiveness of the swaying base latitude-free self-alignment method provided by the disclosure, a simulation experiment is specially designed, and comparison analysis with a traditional swaying base alignment method depending on latitude information and an existing latitude-free swaying base alignment method is performed.

Simulation conditions are set as follows.

The simulation experiment adopts an inertial device with gyroscopic drift being 0.01°/h and accelerometer null bias being $10^{-4}$ g, and a sampling frequency is 100 Hz. Gyroscope random walk is $0.001°/\sqrt{h}$, and accelerometer measurement noise is $10^{-5}$ g/$\sqrt{Hz}$, all treated as white noise. As a reference value of an attitude can be obtained in real time under a simulation environment, as long as a contrast experiment is performed under the same swaying condition, alignment performance of all algorithms can be evaluated by using obtained alignment errors. Thus, local latitude is set by simulation to be 45.7796° (Harbin), the simulation time is 200 s, initial alignment is performed from 0 s to 200 s, and a difference value between an alignment result at an alignment completing moment of the 200th s and a set reference value is used as an alignment error of this experiment. Specifically, in simulation, a swaying balance position is set to be: ρ=0° (rolling), κ=0° (pitching) and Ψ=45° (heading), an initial phase is (0°,0°,0°), and swaying motion meets the following formula:

$$\begin{cases} \rho = 10° \sin\left(\frac{2\pi}{5}t + \phi_i\right) \\ \theta = 10° \sin\left(\frac{\pi}{4}t + \phi_i\right) \\ \psi = 45° + 5° \sin\left(\frac{2\pi}{7}t + \phi_i\right) \end{cases}.$$

Figure 2:
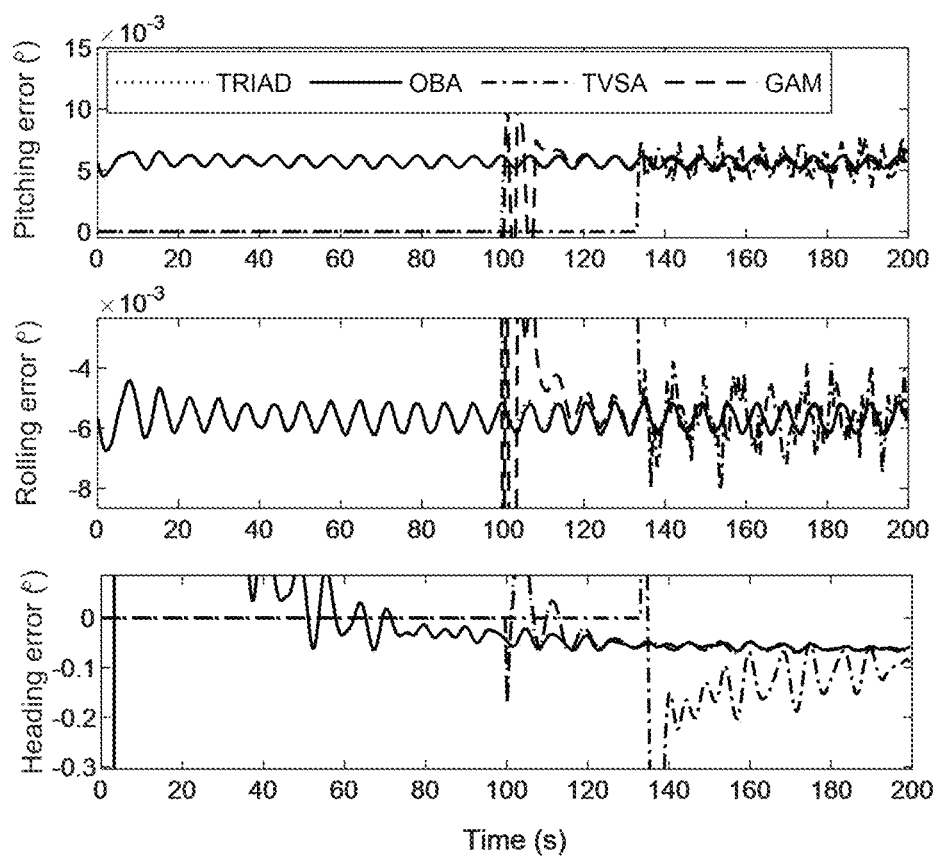
FIG. 2 is alignment error curves of Three-axis Attitude Determination (TRIAD), Optimization-Based Alignment (OBA), Three Vectors Self-Alignment (TVSA) and Gravitational Apparent Motion (GAM).
Figure 3:
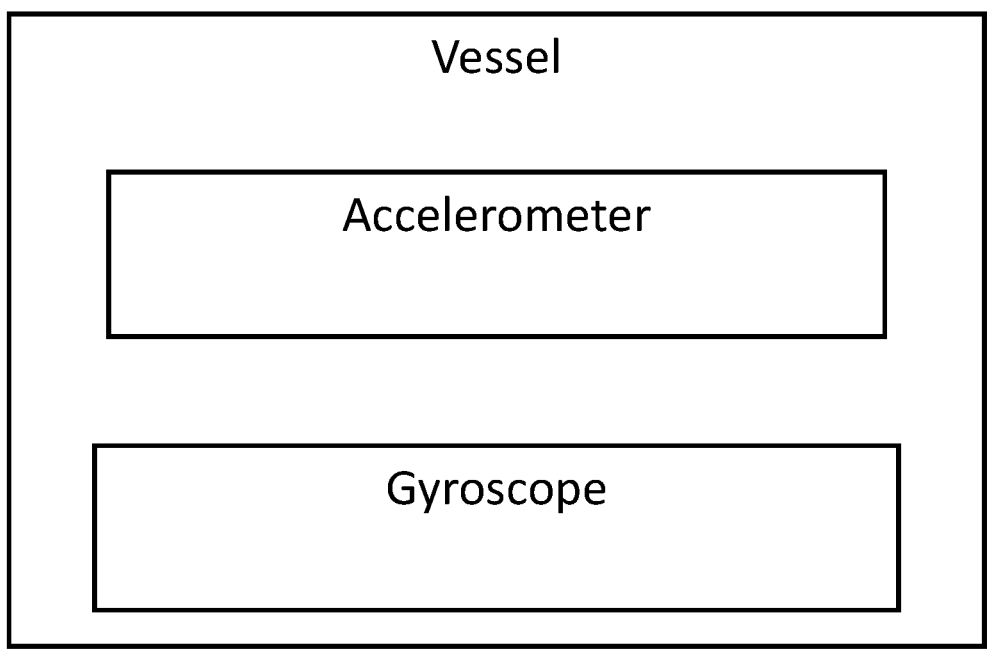
FIG. 3 schematically shows a vessel with an accelerometer and a gyroscope.

Corresponding attitude motion curves of the simulation experiment of the first time are as shown in FIG. 1. FIG. 2 shows alignment error curves of traditional TRIAD and OBA methods depending on external latitude information and latitude-free alignment methods TVSA and GAM. It shows in FIG. 2 that through an alignment process of 200 s, TRIAD, OBA, TVSA and GAM are smaller than 0.01° in horizontal error and smaller than 0.1° in heading error. The GAM latitude-free alignment method provided by the disclosure and the traditional TRIAD method depending on the latitude information are both based on a double-vector alignment concept, thereby being similar in alignment convergence process, and better inhibiting noise interference at the 150th s to enter a convergence state. However, the existing latitude-free alignment method TVSA needs threes groups of vectors to build an objective function and depends on a gravity vector (single frame measured information) under the inertial system at the current moment to determine space orientation information, leading to large noise interference influence within the alignment time (200 s), as shown in FIG. 2, the heading error of TVSA reaches −0.0967°, while the heading error of GAM provided by the disclosure is −0.0604°. Thus, compared with the existing swaying base latitude-free alignment method TVSA, the GAM method provided by the disclosure is faster in alignment convergence speed and better in noise inhibiting capability.

What is claimed is:

1. A method comprising: establishing a first objective function using acceleration vectors obtained by an accelerometer and angular velocity vectors obtained by a gyroscope, wherein the accelerometer and the gyroscope are mounted on a vessel comprising a swaying base that has random perturbations relative to the earth, wherein the first objective function is a function of an orientation of a reference frame $i_{b0}$ of the vessel at time to with respect to an inertial reference frame i, wherein the orientation is represented by a quaternion $$q_i^{i_{b0}};$$

obtaining a first value of $$q_i^{i_{b0}}$$

by optimizing the first objective function with respect to $$q_i^{i_{b0}};$$

establishing a second objective function using a velocity vector or a position vector of the vessel, wherein the second objective function is a function of $$q_i^{i_{b0}},$$

wherein the second objective function is $$\zeta(q_i^{i_{b0}}, \alpha(t_k), \beta(t_k)) = \frac{1}{2} \sum_{t_k \in [t_{k_1}, t_{k_2}]} \left\| \eta(q_i^{i_{b0}}, \alpha(t_k), \beta(t_k)) \right\|^2,$$

wherein $$\alpha(t_k) = \tilde{v}^i(t_k) = -\int_{t_0}^{t_k} \tilde{g}^i(t)dt \text{ and } \beta(t_k) = \tilde{v}^{i_{b0}}(t_k) = \int_{t_0}^{t_k} \tilde{f}^{i_{b0}}(t)dt,$$

or wherein $$\alpha(t_k) = \tilde{p}^i(t_k) = \int_{t_0}^{t_k} \tilde{v}^i(t)dt \text{ and } \beta(t_k) = \tilde{p}^{i_{b0}}(t_k) = \int_{t_0}^{t_k} \tilde{v}^{i_{b0}}(t)dt,$$

wherein $\tilde{v}^i(t_k)$ is the velocity at time $t_k$ in the inertial reference frame i, $\tilde{p}^i(t_k)$ is the position vector at time $t_k$ in the inertial reference frame i, $\tilde{v}^{i_{b0}}(t_k)$ is the velocity vector at time $t_k$ in the reference frame $i_{b0}$.

$$\tilde{p}^{i_{b0}}(t)$$

is the position vector at time $t_k$ in the reference frame $i_{b0}$, $\tilde{g}^i(t)$ is a gravity acceleration vector at the time t in the inertial reference frame i, and $$\tilde{f}^{ib_0}(t)$$

is an acceleration vector of the vessel at time t in the reference frame $i_{b0}$, obtaining a second value of $$q_i^{ib0}$$

by optimizing the second objective function with respect to $$q_i^{ib0}$$

and by using the first value of $$q_i^{ib0}$$

as an initial value;

determining a position and orientation of the vessel in a reference system of the earth based the second value of $$q_i^{ib_0};$$

and steering the vessel using the position and orientation of the vessel in the reference system of the earth.

2. The method according to claim 1, wherein the first objective function is $$\zeta\left(q_i^{ib0}, \tilde{g}^i(t_k), \tilde{f}^{ib_0}(t_k)\right) = \frac{1}{2} \sum_{t_k \in [t_{k_1}, t_{k_2}]} \left\| \eta\left(q_i^{ib0}, \tilde{g}^i(t_k), \tilde{f}^{ib_0}(t_k)\right) \right\|^2;$$

wherein $\eta\left(q_i^{ib0}, \tilde{g}^i(t_k), \tilde{f}^{ib_0}(t_k)\right) = \begin{pmatrix} q_i^{ib0} \otimes \tilde{g}^i(t_{k_1}) \otimes q_i^{*ib0} + \tilde{f}^{ib_0}(t_{k_1}) \\ q_i^{ib0} \otimes \tilde{g}^i(t_{k_2}) \otimes q_i^{*ib0} + \tilde{f}^{ib_0}(t_{k_2}) \end{pmatrix}.$

* * * * *